United States Patent [19]
Hori

[11] Patent Number: 5,242,336
[45] Date of Patent: Sep. 7, 1993

[54] PLANET GEAR APPARATUS

[75] Inventor: Kohei Hori, Chigasaki, Japan

[73] Assignee: Kabushiki Kaisha Toshiba, Kawasaki, Japan

[21] Appl. No.: 910,406

[22] Filed: Jul. 8, 1992

[30] Foreign Application Priority Data
Jul. 8, 1991 [JP] Japan .................. 3-166622

[51] Int. Cl.$^5$ .................................. F16H 1/30
[52] U.S. Cl. ............................. 475/336; 475/220; 475/251; 475/338
[58] Field of Search ............... 475/336, 248, 220, 251, 475/190, 197, 273, 306, 338, 341, 342

[56] References Cited
U.S. PATENT DOCUMENTS

| 37,110 | 12/1862 | Rochow | 475/336 OR |
| 360,194 | 3/1987 | Arneson | 475/336 OR |
| 1,499,763 | 7/1924 | Davis | 475/342 X |
| 3,768,336 | 10/1973 | Wharton | 475/248 X |
| 3,857,301 | 12/1974 | Hanks et al. | 475/342 X |
| 4,106,366 | 8/1978 | Altenbokum et al. | 475/344 |
| 4,680,985 | 7/1987 | Troester | 475/336 X |
| 4,708,290 | 11/1987 | Osmond | 475/336 X |
| 4,864,893 | 9/1989 | Hori | 475/341 |
| 4,942,781 | 7/1990 | Hori | 475/342 |

FOREIGN PATENT DOCUMENTS
0311306  4/1989  European Pat. Off. ............ 475/336
3-38457  6/1991  Japan .

OTHER PUBLICATIONS
G. Sanborn, et al., "Effect of Axis Angle on Tapered Gear Design", pp. 83–84, Nicholas P. Chirons, McGraw Hill, 1967.
Masataka Senba, Gear vol. 10, 1967, pp. 3989–3992.

Primary Examiner—Leslie A. Braun
Assistant Examiner—Daniel Wittels
Attorney, Agent, or Firm—Oblon, Spivak, McClelland, Maier & Neustadt

[57] ABSTRACT

There is disclosed a planet gear apparatus having a gear structure wherein a sun gear attached to an input shaft is a conical involute external gear, one of two adjacent ring gears differing slightly in inside diameter and number of teeth is a stationary ring gear fixed to the planet gear apparatus, the other of the two ring gears is a rotary ring gear rotating about an rotational axis of the input shaft, and a plurality of planetary gears are cylindrical involute spur gears. A rotational axis of each planetary gear is inclined at an angle to the rotational axis of the input shaft, and each planetary gear is meshed between the sun gear, on the one hand, and the two ring gears, on the other, while rotating about its own axis and revolving around the sun gear.

8 Claims, 3 Drawing Sheets

PLANET GEAR APPARATUS

BACKGROUND OF THE INVENTION

1. Field of the Invention

The present invention relates to a planet gear apparatus usable such as a decelerator for decelerating the rotation of an actuating system constituting, for example, a joint actuating unit of a robot.

2. Description of the Related Art

In general, in a multi-joint robot, actuators for actuating joints of the robot are provided distributively for the respective joints. Each actuator comprises a motor and a decelerator for decelerating the rotational speed of the motor. It is required that this type of decelerator have a small size, a light weight and a large deceleration ratio, as well as a high torque transmission performance with a high torque and a high torsional strength.

FIG. 3 shows a typical conventional planet gear apparatus 100 used as a decelerator which meets the above requirements. Specifically, in the planet gear apparatus 3, an input shaft 101 is driven to rotate a sun gear 103. The torque of the sun gear 103 is transmitted to three planetary gears 107 arranged equidistantly and meshed with both sun gear 103 and stationary ring gear 105. Thus, the planetary gears 107 revolve around the sun gear 103, while rotating about their own axes. Each planetary gear 107 is also meshed with a rotary ring gear 109, in addition to the stationary ring gear 105. The number of teeth of the rotary ring gear 109 is slightly different from that of the stationary ring gear 105 by, for example, two or three. Thus, an output shaft 111 coupled to the rotary ring gear 109 is rotated. Specifically, when each planetary gear 107 revolves around the sun gear 103 while rotating about its own axis, the rotary ring gear 109 rotates in accordance with the difference in the number of teeth between the rotary ring gear 109 and the stationary ring gear 105. As a result, the rotation speed of the output shaft 111 is decelerated relative to that of the input shaft 101.

In the conventional planet gear apparatus 100 having the above structure, cylindrical involute spur gears are generally used as the respective gears. The stationary ring gear 105 and the rotary ring gear 109 are coaxial with the sun gear 103. The rotary shaft of the each planetary gear 107 meshed with the stationary ring gear 105 and rotary ring gear 109 is parallel to the rotary shafts of the stationary ring gear 105, rotary ring gear 109 and sun gear 103. It is necessary that the stationary ring gear 105 and rotary ring gear 109, which are different from each other in the number of teeth and arranged coaxially, be precisely meshed with each planetary gear 107. For this purpose, the addendum modification factor of the ring gear having a less number of teeth, e.g. the stationary ring gear 105, is increased. Accordingly, as shown in FIG. 4, the diameter of an addendum circle 105a of the stationary ring gear 105 is designed to be substantially equal to that of an addendum circle 109a of the rotary ring gear 109. The three planetary gears 107 meshed with the stationary ring gear 105 and rotary ring gear 106 have common specifications and integrated. Thus, the diameters of the addendum circles 107a of the portions of the planetary gears 107, which are meshed with the stationary ring gear 105 and rotary ring gear 109, are equal to one another.

In the planet gear apparatus 100 having the above structure, 1) a deceleration ratio is determined by differential movement corresponding to a difference in the number of teeth between the stationary ring gear 105 and rotary ring gear 109, 2) since the planetary gears 107 meshed with the stationary ring gear 105 and rotary ring gear 109 are integrated into one body, as stated above, the amount of deformation of the planetary gears 107 is small, and 3) since the output from the rotary ring gear 109 can be derived directly, the torsional strength of the apparatus is high and the apparatus has a small number of parts, a small size and a light weight.

The conventional planet gear apparatus having the above structure, however, has the following problem.

There has recently been a demand for high-speed actuation of an industrial robot. For example, a decelerator having a low deceleration ratio, e.g. 30:1 to 80:1, is needed. To meet the need, in a conventional planet gear apparatus, when the number of planet gears is three and the difference in the number of teeth between the rotary ring gear and the stationary ring gear is three, a deceleration ratio of about 60:1 or more can be obtained. However, it is not possible to obtain a deceleration ratio less than this value.

On the other hand, in the conventional planet gear apparatus, for example, if it is possible to use three planetary gears and set the different in number of teeth at "6", the deceleration ratio of the planetary gears can substantially be reduced to ½ and the above requirement can be met.

However, in the case of the conventional structure, if an attempt is made to mesh the planetary gears with both ring gears precisely, the addendum modification factor of the ring gear having a less number of teeth becomes high, i.e. three or more. Thus, it is practically impossible to constitute the planet gear apparatus. Because of the above, the conventional planet gear apparatus having a small size, a light weight and a "high deceleration ratio" can be obtained, but it is not possible to achieve a "low deceleration ratio" which can meet the requirement for "high-speed actuation" in modern industrial robots.

SUMMARY OF THE INVENTION

The object of the present invention is to provide a planet gear apparatus having a lower deceleration ratio than a conventional apparatus, without losing advantages of this type of apparatus, such as small size, light weight, high strength and high efficiency.

In order to achieve this object, there is provided a planet gear apparatus comprising:

an input shaft coupled to a driving source and rotating at high speed;

a sun gear disposed at one end portion of the input shaft;

a plurality of ring gears arranged adjacent to each other along the axis of the input shaft, around the sun gear at a distance from the periphery of the sun gear, the number of teeth of one of the ring gears being different from that of teeth of the other ring gear; and a plurality of planetary gears meshed between the sun gear and the ring gears, the planetary gears rotating about their own axes and revolving around the input shaft, wherein a rotational axis of each of the planetary gears is inclined at an angle to the input shaft.

Specifically, a stationary ring gear and a rotary ring gear having a common rotational axis are used as the two ring gears, and cylindrical involute spur gears are used as the planetary gears. The planetary gears are meshed with the ring gears and the sun gear (i.e. conical external gear) on the input shaft, thereby forming a gear structure. The rotational axis of each planetary gear is inclined at an angle to the rotational axis of the input shaft which coincides with the rotational axis of the ring gears.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
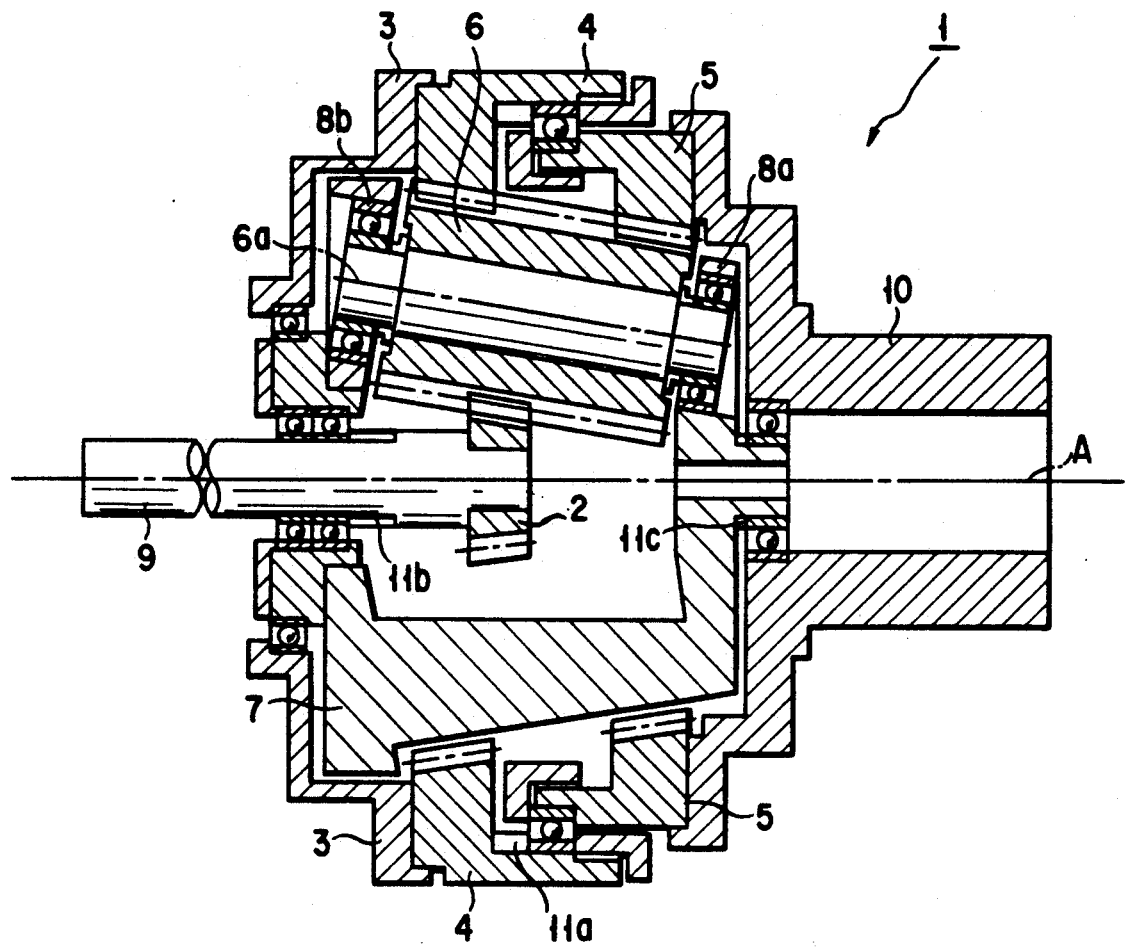
FIG. 1 is a vertical cross-sectional view of a planet gear apparatus according to an embodiment of the present invention, taken in the direction of the rotary shaft the planet gear apparatus.

FIG. 1 shows a planet gear apparatus 1 according to the present invention. The apparatus 1 comprises a sun gear 2 having a center axis A as a rotary axis, a stationary ring gear 4 fixed to a casing 3 coaxially with the sun gear 2, and a rotary ring gear 5 rotatable relative to the casing 3 (i.e. the stationary ring gear 4). The number of teeth of the stationary ring gear 4 is greater than that of the rotary ring gear 5.

Three planetary gears 6 are meshed with both stationary ring gear 4 and rotary ring gear 5. The planetary gears 6, on the other hand, are meshed with the sun gear 2. The three planetary gears 6 are rotatably coupled to a carrier 7 via bearings 8a and 8b. The planetary gears 6 are arranged equidistantly around the sun gear 2.

Figure 2:
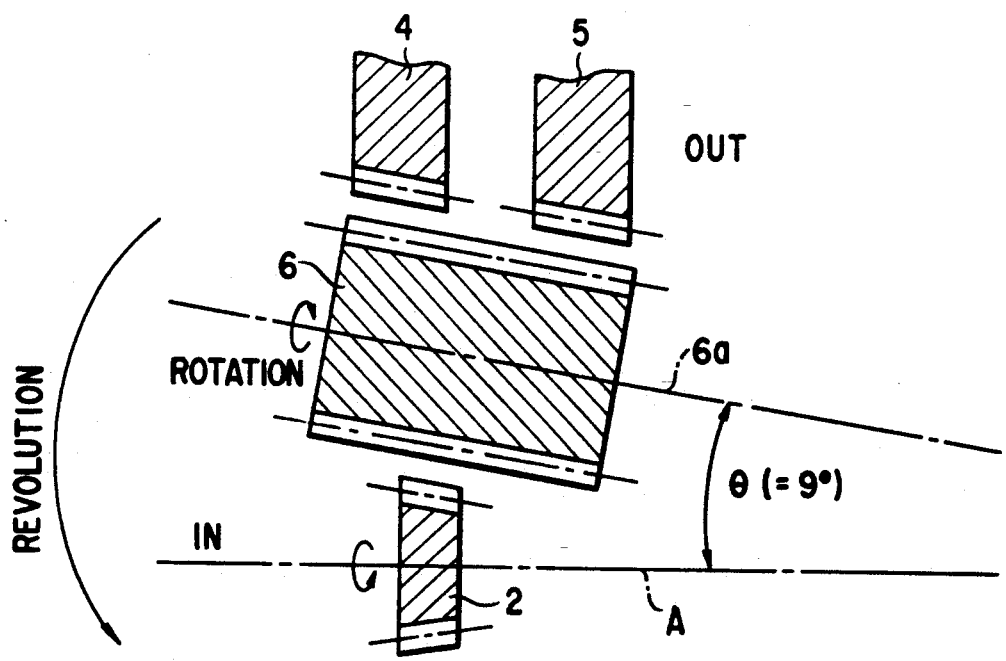
FIG. 2 is a schematic cross-sectional view of an important portion of the planet gear apparatus according to the embodiment of the invention.
Figure 4:
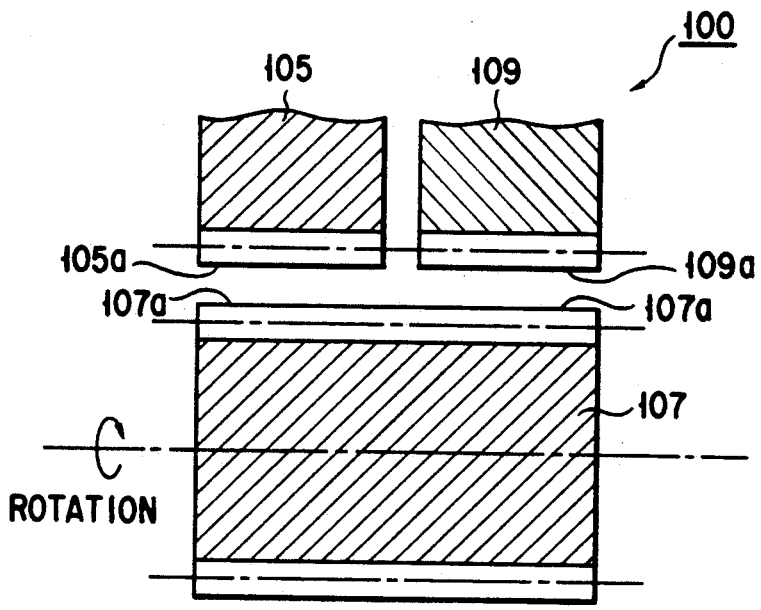
FIG. 4 is a schematic cross-sectional view of an important portion of the conventional planet gear apparatus.
Figure 3:
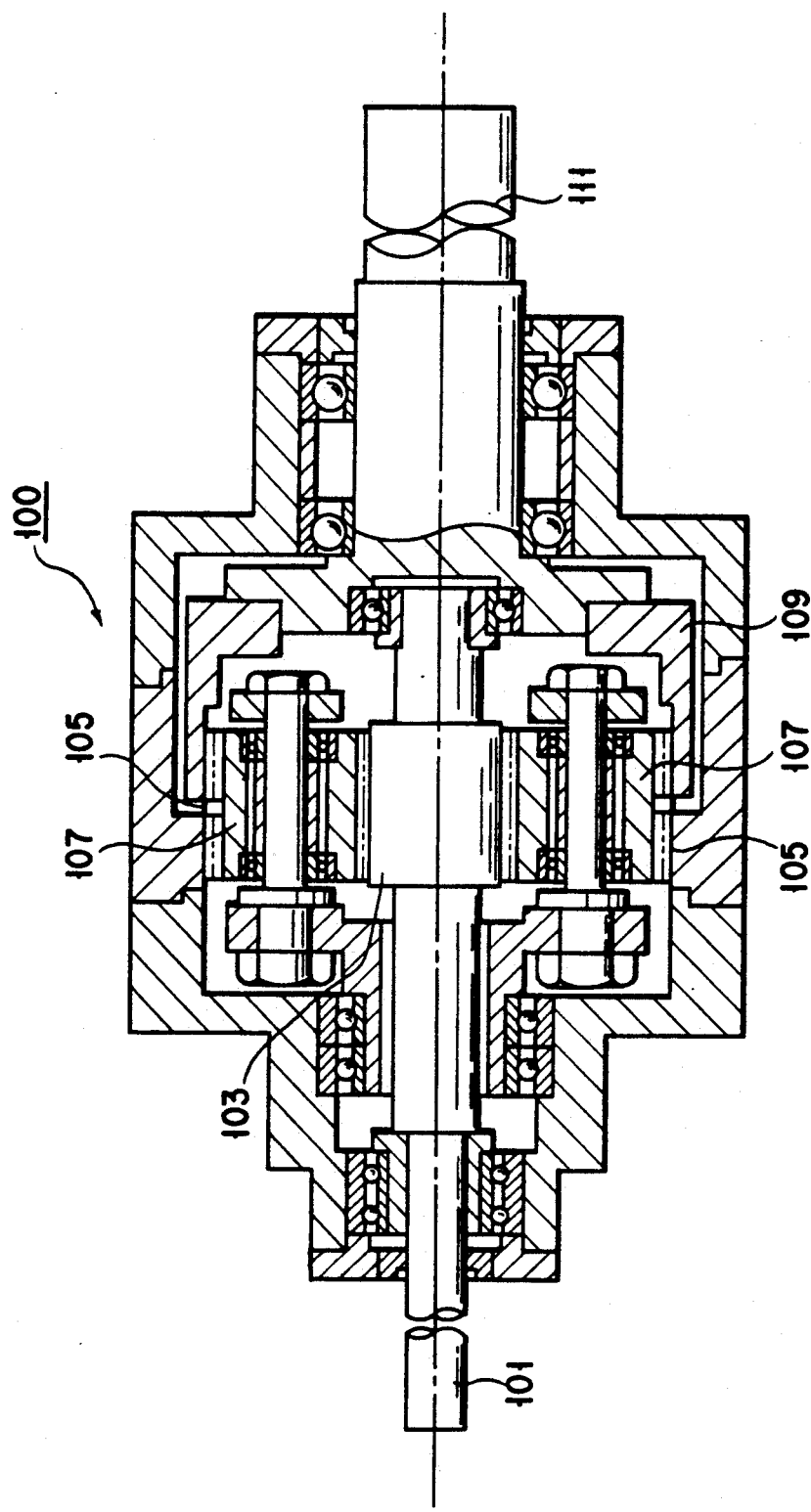
FIG. 3 is a vertical cross-sectional view of a conventional planet gear apparatus, taken in the direction of the rotary shaft of the apparatus.

FIG. 2 shows the positional relationship between the sun gear 2, stationary ring gear 4, rotary ring gear 5 and planetary gear 6. For the purpose of simple description, the respective gears are distanced diametrically.

The planetary gears 6 are cylindrical involute spur gears having the same tooth shape over the entire teeth width. A rotary axis 6a of the planetary gear 6 is inclined with respect to the center axis A by angle $\theta$ (e.g. $\theta \div 9°$).

On the other hand, conical involute gears are used as the sun gear 2, stationary ring gear 4 and rotary ring gear 5, so that these can be meshed with the planetary gears. The addendum modification factor of each conical gear decreases along its tooth trace. Thus, its tooth shape, too, varies radially from its center axis. The inside diameter of the stationary ring gear 4 differs from that of the rotary ring gear 5. In this embodiment, the inside diameter of the stationary ring gear 4 is greater.

The specifications relating to the gears 2, 4, 5 and 6 used in the embodiment of the present invention are as follows. These gears are involute gears machined by a gear cutting tool having a module of 1.5 and a pressure angle of 20°, and the numbers of teeth of the gears 2, 4, 5 and 6 are "12, 48, 42 and 17", respectively. That is, the difference in the number of teeth between the two ring gears 4 and 5 is six.

According to the planet gear apparatus 1 having the above structure, the three planetary gears 6 can rotate about their own axes 6a (i.e. rotary axes) and revolve around the sun gear 2. For example, when a shaft 9 is used as an input shaft and a shaft 10 as an output shaft, a predetermined deceleration ratio can be obtained by a differential movement corresponding to a different in the number of teeth between the ring gears 4 and 5.

The operation and advantages of the present invention having the above structure will now be described.

In the present invention, the ring gears 4 and 5 are conical gears having different inside diameters and the planetary gears 6 are cylindrical spur gears having inclined rotary axes 6a. If three planetary gears 6 are simultaneously meshed with both ring gears 4 and 5, the difference in the number of teeth between the ring gears 4 and 5 will be able to be six. As a result, the addendum modification factor can remarkably be reduced. In addition, if the planet gear apparatus 1 is constituted according to the above-mentioned specifications, the deceleration ratio is reduced to about $\frac{1}{2}$, compared to the prior art, i.e. 35:1.

According to the planet gear apparatus of the present embodiment wherein the conical involute gear and cylindrical involute gear are combined, tooth contact is realized over the entire tooth width and therefore a large torque can be attained.

Since the conical involute gear is employed, its "rattling" or "backlash" can be minimized by finely adjusting each conical gear in its axial direction. Regarding this point, as shown in FIG. 1, the mutual position of the gears is adjusted by providing spacers 11a, 11b and 11c. Needless to say, the number of spacers and the thickness of each spacer can be adjusted.

By employing the above structure, the addendum modification factor can remarkably be reduced and the difference in the number of teeth between the ring gears 4 and 5 can be increased (e.g. "six" or "nine").

(Operation 1) A planet gear apparatus having a remarkably reduced deceleration factor, as compared to a conventional apparatus, can be obtained.

(Operation 2) The backlash of the gears can be reduced.

(Operation 3) Tooth touch is realized over the entire tooth width; therefore, a large torque can be transmitted, despite the small size and light weight of the apparatus.

(Operation 4) Noise occurring due to meshing of gears can be reduced.

(operation 5) The higher efficiency will be provided by the bigger difference in the number of teeth between the ring gears.

The present invention is not limited to the above embodiment. For example, spiral helical gears may be used for the sun gear, stationary ring gear, rotary ring gear and planetary gears.

In the above embodiment, conical gears are used as both ring gears and cylindrical gear are used as planetary gears; however, according to another embodiment, spur gears having different inside diameters may be used as both ring gears, and planetary gears having two addendum circles to be meshed with these spur gears may be used.

According to a first modification of the invention, the difference in the number of teeth between both ring gears may be set at a value other than employed in the embodiment of the invention.

According to a second modification, the inside diameter of the rotary ring gear may be greater than that of the stationary ring gear.

Similarly, the specifications of each gear are not limited to the above embodiment. In particular, the number of teeth of each gear is not limited to the above-mentioned values. By varying the number of teeth, various deceleration ratios can be attained on an as-needed basis. The difference in the number of teeth needs to be more than two, and it may be three.

According to a third modification, the angle of inclination of each planetary gear can be freely chosen, depending on the difference in inside diameter between the ring gears.

According to a fourth modification, the number of planetary gears can be varied. (For example, when the difference in number of teeth between both ring gears is four, the numbers of teeth of the sun gear, stationary ring gear, rotary ring gear and each planetary gear may be set at "12, 48, 44 and 17", respectively. Similarly, when the difference in number of teeth is 5, the numbers of teeth may be "15, 50, 45 and 17", respectively.)

In the present embodiment, the apparatus of this invention is applied to the decelerator; however, if the shaft 10 is used as an input shaft and the shaft 9 as an output shaft in FIG. 1, this apparatus is applicable to an accelerator.

In addition, the present invention is applicable to other gear apparatuses having no sun gear.

(Advantage 1) Since the two ring gears have different inside diameters, the difference in the number of teeth between the ring gears can be increased. Accordingly, by meshing the two ring gears with the planetary gears, a planet gear apparatus having a lower deceleration ratio than a conventional apparatus can be obtained without losing the advantages of the apparatus, i.e. small size, light weight, high strength and high efficiency.

(Advantage 2) When conical internal gears are used for the ring gears and cylindrical spur gears are used for the planetary gears, the backlash can easily be controlled by adjusting the axial position of these gears.

As has been described above, according to the present invention, there is provided a planet gear apparatus having a lower deceleration than a conventional apparatus, while maintaining small size, light weight and high strength.

(Advantage 3) Therefore, it is not necessary to manufacture each gear with high precision, and an increase in manufacturing cost of the planet gear apparatus can be prevented.

Additional advantages and modifications will readily occur to those skilled in the art. Therefore, the invention in its broader aspects is not limited to the specific details, representative devices, shown and described herein. Accordingly, various modifications may be made without departing from the spirit or scope of the general inventive concept as defined by the appended claims and their equivalents.

What is claimed is:

1. A planet gear apparatus, comprising:
an input shaft rotating at high speed;
a sun gear disposed at one end portion of the input shaft;
a plurality of ring gears arranged adjacent to each other along an axis of the input shaft, around the sun gear at a distance from a periphery of the sun gear, each of the ring gears having a plurality of teeth formed concentrically, the number of teeth of one of the ring gears being different from that of teeth of another of the ring gears; and
a plurality of planetary gears whose teeth have a substantially constant profile along an axial direction of said planet gear, each of said planetary gears meshed with the sun gear and the ring gears, the planetary gears rotating about their own axes and revolving around the input shaft,
wherein a rotational axis of each of the planetary gears is inclined at an angle to the input shaft.

2. The planet gear apparatus according to claim 1, wherein said ring gears comprise a stationary ring gear fixed to the planet gear apparatus and a rotary ring gear rotating about the input shaft and constituting a part of an output shaft of the planet gear apparatus, said stationary ring gear and said rotary ring gear having a common rotational axis,
said sun gear is a single conical involute external gear,
said planetary gears are cylindrical involute spur gears,
said planetary gears are meshed with said ring gears and said sun gear, thereby forming a gear structure, and
the rotational axis of each of said planetary gears is inclined at an angle to the input shaft and the rotational axis of said ring gears which coincides with the axis of the input shaft.

3. The planet gear apparatus according to claim 2, wherein the number of said planetary gears is three, and a difference in the number of teeth between said stationary ring gear and said rotary ring gear is three.

4. The planet gear apparatus according to claim 2, wherein the number of said planetary gears is three, and a difference in the number of teeth between said stationary ring gear and said rotary ring gear is six.

5. The planet gear apparatus according to claim 1, wherein said planetary gears comprise three spiral helical gears.

6. A planet gear apparatus, comprising:
an input shaft rotating at high speed;
a sun gear disposed at one end portion of the input shaft;
a plurality of ring gears arranged adjacent to each other along an axis of the input shaft, around the sun gear at a distance from a periphery of the sun gear, each of the ring gears having a plurality of teeth formed concentrically, the number of teeth of one of the ring gears being different from that of teeth of another of the ring gears; and
a plurality of planetary gears meshed with the sun gear and the ring gears, the planetary gears rotating about their own axis and revolving around the input shaft, each of said planetary gears having a diameter and a tooth profile which is substantially the same at first and second locations, in which each planetary gear meshes with one of said plurality of ring gears at said first location, and each of said planetary gears meshes with a second of said plurality of ring gears at said second location;

wherein a rotational axis of each of the planetary gears is inclined at an angle to the input shaft.

7. A planet gear apparatus, comprising:

an input shaft rotating at high speed;

a sun gear disposed at one end portion of the input shaft;

a plurality of ring gears arranged adjacent to each other along an axis of the input shaft, around the sun gear at a distance from a periphery of the sun gear, each of the ring gears having a plurality of teeth formed concentrically, the number of teeth of one of the ring gears being different from that of teeth of another of the ring gears; and a plurality of planetary gears meshed with the sun gear and the ring gears, the planetary gears rotating about their own axis and revolving around the input shaft, each of said planetary gears having continuous toothed surfaces extending at least from a first meshing location at which each of the planetary gears meshes with one of the plurality of ring gears to a second location at which the planetary gears mesh with a second of said plurality of ring gears, wherein a rotational axis of each of the planetary gears is inclined at an angle to the input shaft.

8. A planet gear apparatus, comprising:

an input shaft rotating at high speed;

a sun gear disposed at one end portion of the input shaft;

a plurality of ring gears arranged adjacent to each other along an axis of the input shaft, around the sun gear at a distance from a periphery of the sun gear, each of the ring gears having a plurality of teeth formed concentrically, the number of teeth of one of the ring gears being different from that of teeth of another of the ring gears; and a plurality of planetary gears meshed with the sun gear and the ring gears, the planetary gears rotating about their own axis and revolving around the input shaft, each of said planetary gears having a diameter at a location meshing with one of the ring gears which is substantially the same as the diameter at a location at which the planetary gears mesh with another of said plurality of ring gears, wherein a rotational axis of each of the planetary gears is inclined at an angle to the input shaft.

* * * * *